United States Patent
Chea, Jr. et al.

(10) Patent No.: US 6,546,089 B1
(45) Date of Patent: *Apr. 8, 2003

(54) METHOD AND SYSTEM FOR SUPPORTING A LIFELINE ASSOCIATED WITH VOICE OVER DSL

(75) Inventors: Ramon C. W. Chea, Jr., San Jose, CA (US); P. Kingston Duffie, Palo Alto, CA (US)

(73) Assignee: Turnstone Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,964

(22) Filed: May 26, 2000

Related U.S. Application Data

(63) Continuation-in-part of application No. 09/569,962, filed on May 12, 2000.

(51) Int. Cl.[7] .............................................. H04M 11/00
(52) U.S. Cl. .............................. 379/93.06; 379/93.09; 370/216
(58) Field of Search ........................ 379/399.01, 27.06, 379/379, 304, 93.01, 93.09, 100.15, 100.16, 27.01, 27.08, 9.05

(56) References Cited

U.S. PATENT DOCUMENTS

| | | | |
|---|---|---|---|
| 5,594,727 A | * | 1/1997 | Kolbenson et al. |
| 5,883,941 A | * | 3/1999 | Akers |
| 6,081,517 A | * | 6/2000 | Liu et al. |
| 6,272,209 B1 | * | 8/2001 | Bridger et al. |
| 6,400,803 B1 | * | 6/2002 | Tate et al. |

FOREIGN PATENT DOCUMENTS

| | | | | |
|---|---|---|---|---|
| EP | 0 740 451 A1 | | 10/1996 | .......... H04M/11/06 |
| EP | 0844802 A2 | * | 5/1998 | |
| GB | 2313979 A | | 10/1997 | .......... H04M/11/06 |
| WO | WO 01 60111 A1 | | 8/1991 | .......... H04M/11/06 |
| WO | WO /01/13593 | | 2/2001 | .......... H04L/12/64 |
| WO | WO 01/17219 | | 3/2001 | .......... H04M/11/00 |

* cited by examiner

*Primary Examiner*—Forester W. Isen
*Assistant Examiner*—Ramnandan Singh
(74) *Attorney, Agent, or Firm*—Pillsbury Winthrop LLP

(57) ABSTRACT

The present invention relates to systems and methods for providing a "lifeline" service to a VoDSL customer despite an electrical power outage or integrated access device failure at the customer premise. A bypass function is implemented in an integrated access device at the customer premise to provide the lifeline service. The bypass function is preferably a relay, which can be automatically activated to provide the lifeline service under various conditions. The bypass relay, working in conjunction with systems in the central office and the regional switching center allows the customer to obtain an active telephone line during power outages or integrated access device failures. Electrical power is also supplied to the customer's premise from the central office, thereby allowing the customer to use a telephone line in the traditional manner. The present invention can further be implemented for any number of customers and telephone lines.

14 Claims, 12 Drawing Sheets

VoDSL ARCHITECTURE WITH LIFELINE SUPPORT IN FIRST PREFERRED EMBODIMENT

CALL TERMINATION OPERATION TO CUSTOMER PREMISE

METHOD AND SYSTEM FOR SUPPORTING A LIFELINE ASSOCIATED WITH VOICE OVER DSL

This is a continuation in part application of Ser. No. 09/569,962, filed May 12, 2000.

FIELD OF THE INVENTION

The present invention relates to Voice over DSL (VoDSL) architectures for supporting a "lifeline" service. More particularly, the present invention is directed to systems and methods for providing a telephone service to a VoDSL customer despite an electrical power outage or integrated access device failure at the customer premise.

BACKGROUND OF THE INVENTION

Due to recent changes in the telecommunications industry (i.e., deregulation of local markets) and recent advancements in technologies that better utilize the existing copper loop infrastructure, digital subscriber line (DSL) is one of the most promising technologies for delivering viable low-cost, high-speed data to many business and residential customers. As is well known, DSL uses the existing copper loop that is traditionally used for conventional telephony to deliver voice and data at high bandwidth. DSL carries both voice and data signals simultaneously, in both directions, allowing a customer to log onto the Internet and make a telephone call at the same time. In other words, since DSL uses packet switching technology that operates independently of the voice telephone system, this allows telephone companies to provide Internet service and not lock up circuits for telephone calls. Thus, it is easy to understand why DSL technology is becoming the preferred method for sending/receiving both voice and digital data/signals in the telecommunications industry.

As is well known, there are different competing forms of digital subscriber line technologies collectively designated as xDSL technologies with the "x" representing various one or more letter combinations, which are used in front of the "DSL" acronym to designate the type of technology being used. Some of the more prevalent xDSL technologies include HDSL, ADSL, SDSL, RADSL, VADSL, and VDSL.

One particular technology known as Voice over DSL (VoDSL) provides multiple phone channels to be delivered over a DSL line, which itself is delivered over a single copper pair. Using VoDSL, multiple services—voice, data, fax, video conferencing, etc.—can be delivered over the single copper pair. In other words, by enabling up to, for example, 24 telephone channels (can be more or less than 24) and high-speed Internet access (typically at speeds up to 1.5 megabits per second) to be delivered over a single DSL connection, VoDSL systems allow service providers to apply DSL broadband access networks to small to mid-size business markets and residential homes. VoDSL essentially turns one copper pair into multiple telephone channels and one high-speed data channel. This substantially lowers the infrastructure cost for delivering such services when compared to T1 lines or multiple copper pairs.

FIG. 1 illustrates a simplified diagram of a conventional VoDSL architecture. In the conventional architecture, a regional switching center is connected to a customer premise (residential, business, small office/home office—SOHO, etc.) via a central office (CO) and a copper loop 10 (pair of copper wires). In the customer premise, an integrated access device (IAD) 12 (perhaps in a wiring closet) is connected to a data terminal such as the PC and multiple voice terminals such as telephones PH-1, . . . , PH-m, where m is some arbitrary number of channels/telephones. As known, the IAD 12 delivers both voice and data services to the customer and is described in greater detail later herein.

The IAD 12 is connected to a DSL access multiplexer (DSLAM) 8 at the CO via the copper loop 10. As known, the DSLAM 8 generally receives incoming DSL signals and aggregates the traffic onto high-speed uplink trunks such as DS3 or SONET optical link.

In the regional switching center, an ATM (asynchronous transfer mode) switch 6 is connected to the DSLAM 8 via the high speed trunk such as DS3 or SONET optical link. ATM is a high-speed networking standard used in WANs and often used to route DSL traffic to the Internet backbone. One ATM switch 6 can be connected to many DSLAMs (hundreds, thousands) 8, which in turn, can support many IADs 12. The ATM switch 6 is further connected to a data network (e.g., Internet) and a public switched telephone network (PSTN) via a voice gateway 4 and a Class 5 voice switch (C5) 2.

The C5 switch 2, gateway 4, ATM switch 6, and DSLAM 8 are well known in the industry and thus will not be discussed in great detail. Communication interface between the gateway 4 and the C5 switch 2 is through an interface standard such as TR-303 or TR-008. The TR-303 and TR-008 are standard interfaces developed for the North America PSTN for inter-working of voice switches and digital loop carrier (DLC) systems.

The C5 switch 2, gateway 4, ATM switch 6, DSLAM 8, and IAD 12 are conventionally known as network elements in the reference model for the conventional architecture. The IAD 12 is not an independent network element per se, but rather a subtending subsystem to the gateway 4. Thus, the gateway 4 and the subtending IAD 12 form an independent network element. Each gateway 4 and C5 switch 2 can support multiple IADs 12, depending on their capacities.

Associated with each network element is a software program generically known as an element management system (EMS), which manages the operation of each network element. The operation, administration, and maintenance (OAM) functions of the VoDSL network is performed by an operation support system (OSS) which supports the C5 switch 2, and works in conjunction with the EMSs for managing the gateway 4 and DSLAM 8. The OSS controls and coordinates all the network elements.

During operation, the IAD 12 receives, digitizes, packetizes, compresses the voice and data signals and formats them for transmission from the customer. The IAD 12 then sends the voice and data signals out in separate virtual circuits, with the voice circuit getting priority. Virtual circuits are connected to the DSLAM 8, which combines virtual circuits from multiple customers and/or IADs 12 and send them to the ATM switch 6 in the regional switching center. The ATM switch 6 then sends the data signals to the data network such as the Internet and the voice signals to the voice gateway 4. The gateway 4 decompresses and depacketizes the signals and sends them to the C5 switch 2, which signals are then sent to the PSTN.

Conversely, when the signals are sent from the regional switching center to the customer premise, the gateway 4 receives digital voice signals and formats them into packets for transmission to the ATM switch 6. The ATM switch 6 also receives data signals from the data network. These signals are then sent to the IAD 12 through the DSLAM 8 and copper loop 10. The IAD 12 receives the signals and distributes them to the proper terminals.

FIG. 2 illustrates a more detailed diagram of a DSLAM and IAD in the conventional VoDSL architecture of FIG. 1. In greater detail, the DSLAM 8 consists of an ATM interface block (AIB) 20 connected to n-number of DSL (xDSL) termination unit-CO (TU-C) 22a, 22i, 22n. Each TU-C 22a, 22i, 22n is further connected to a loop pair (pair-1, pair-i, pair-n), which terminates at a corresponding IAD-I 12a, IAD-i 12i, IAD-n 12n. As can be appreciated, there will be n-number of IADs corresponding to n-number of TU-Cs and loop pairs.

Using IAD-i 12i as an example, it consists of an DSL (xDSL) termination unit-remote (TU-R) 30 or similar unit that is further connected to a service interface block (SIB) 32. The SIB 32, which distributes signals to different terminals, is further connected to a data module (DM) 34 for high speed data service to the data terminal (PC) and to m-number of phone modules PM1 36-1, PMm 36-m, which are connected to multiple telephones PM-1, PM-m, respectively. Currently, m can be any arbitrary number such as 14, 16, 24, so long as the system components can support the m number of telephone lines. Accordingly, the IAD-i 12i typically supports one high-speed data port and m-number of telephone ports.

To fully implement the conventional VoDSL system, power is supplied to the IAD-i 12i using a power supply (PS) 39 (110 Vrms, 60 Hz) from the customer premise because it is not economically feasible to power the IAD-i 12i from a CO battery. In addition, the connecting terminals of the TU-C 22i and TU-R 30 to the copper pair are normally capacitively coupled, meaning that there is no DC electrical path. As a result, the PS 39 takes AC power and converts it into DC voltage source to power the electronics within the IAD-i 12i.

At this point, it is important to point out that the copper pairs connecting the DSLAM 8 to the IADs 12a, 12i, 12n are "dry." In other words, there is no DC current flowing through the copper pairs from the CO to the customer premise in the conventional VoDSL system. Conversely, in a conventional plain old telephone system (POTS), the copper pairs are "wet," which means that there can be DC current flowing through them. Wet copper pairs are normally connected to the CO battery to provide loop supervision and talk current to the telephone.

There are several major shortcomings and disadvantages associated with the conventional VoDSL architecture. For example, because the IAD is powered from the customer premise, electrical power outage at the customer's premise results in lost of services, and in particular telephone service to the customer. Further, a failure or defect in particular components of the IAD can also result in lost telephone and data service to the customer. These shortcomings and disadvantages are typically uncommon in the POTS system, since the telephone service is powered by the CO battery rather than power from the customer's premise.

As a result, power outages and/or IAD failures prevent the customer from using his/her telephone for an unspecified period of time. This can be unacceptable when there is an emergency and 911 service is needed. This lack of a "lifeline support" has been viewed by many in the telecommunications industry to be the critical factor inhibiting the widespread deployment of VoDSL technology.

As stated above, the conventional VoDSL architecture is generally workable when there is adequate and stable power at the customer premise, but is found to be inadequate and unworkable when there is a power outage and/or IAD failure/defect at the customer premise. Accordingly, there is a need for reliable and efficient systems and methods for providing a lifeline support to a VoDSL customer during a power outage, IAD failure, and the like at the customer premise. The lifeline support is needed to keep a telephone line or "lifeline" available during emergency or other situations.

SUMMARY OF THE INVENTION

In view of the above-described problems of the prior art, it is an object of the present invention to provide systems and methods for providing a lifeline support to a VoDSL customer.

It is another object of the present invention to provide a lifeline support to a VoDSL customer using the existing VoDSL architecture.

It is yet another object of the present invention to provide a lifeline support when there is an electrical power outage at the customer's premise having VoDSL service.

It is a further object of the present invention to provide a lifeline support when there is an integrated access device failure at the customer's premise having VoDSL service.

It is still a further object of the present invention to provide systems and methods for actuating a bypass function in an IAD located at the customer premise.

It is yet another object of the present invention to provide one or more active telephone lines to one or more VoDSL customers when electrical power or IAD failure occurs at the customers' premises.

These and other objects of the present invention are obtained by providing a bypass function in the IAD located in the customer's premise. The bypass function is preferably a relay, which can be automatically activated to provide the lifeline support. The relay in the IAD, working in conjunction with systems in the central office and the regional switching center allows the customer to obtain an active telephone line. Electrical power is supplied to the customer's premise from the central office, thereby allowing the customer to use a telephone line in the traditional manner. The present invention can be implemented for any number of customers and telephone lines.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
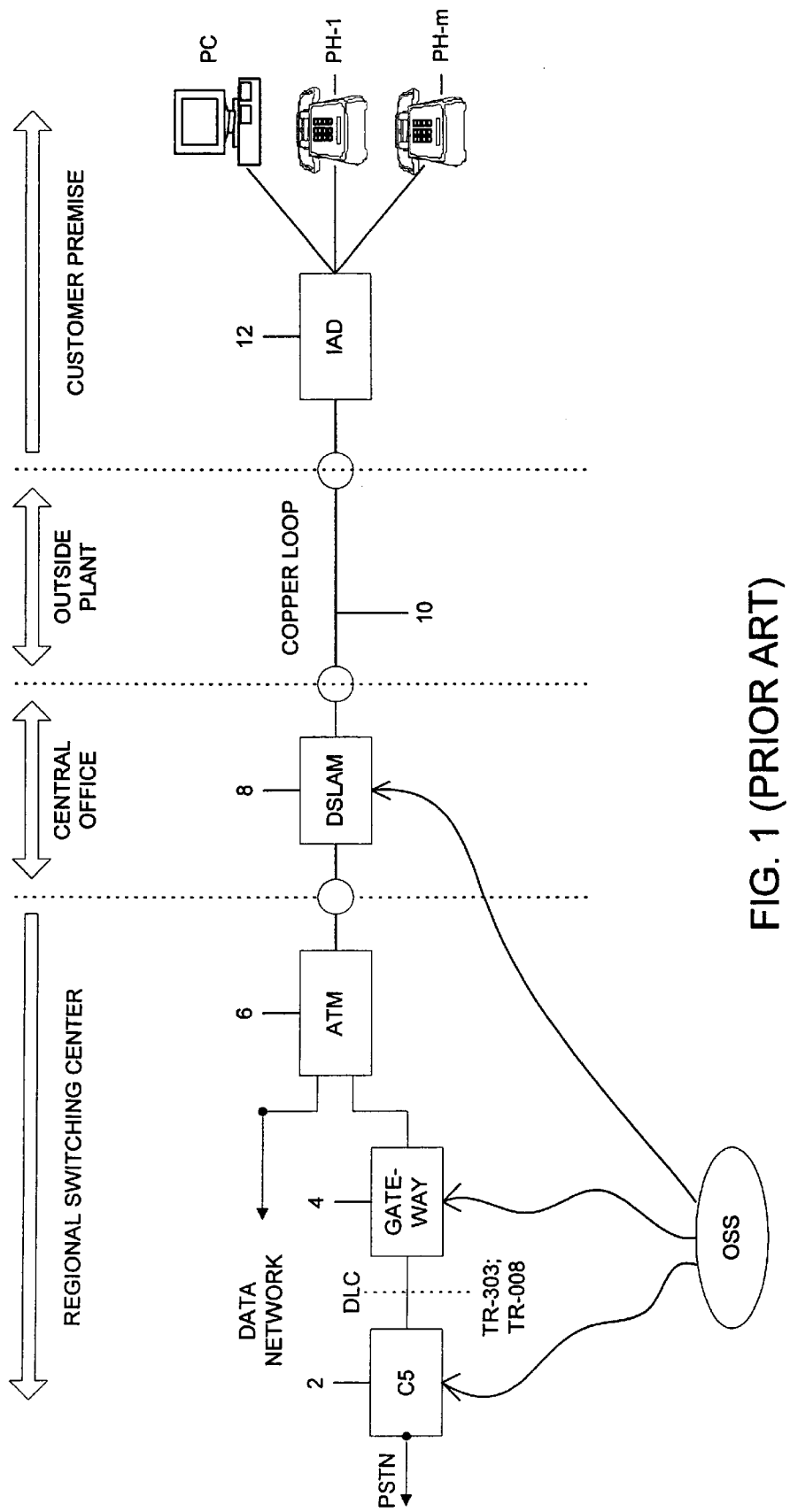
FIG. 1 illustrates a simplified block diagram of a conventional VoDSL architecture.

The present invention will now be described in greater detail, which will serve to further the understanding of the preferred embodiments of the present invention. As described elsewhere herein, various refinements and substitutions of the various embodiments are possible based on the principles and teachings herein.

The preferred embodiments of the present invention will be described with reference to FIGS. 3–12, wherein like components and steps are designated by like reference numerals throughout the various figures. Further, specific parameters such as system architecture, circuit layouts, and the like are provided herein, and are intended to be explanatory rather than limiting.

The present invention is directed to methods and systems for supporting a lifeline in an VoDSL architecture. In other words, the present invention allows a customer to use a telephone line on the VoDSL system even though there is an electrical power outage or IAD failure at the customer premise. This is accomplished by bypassing certain components in the IAD in the customer premise and "substituting" them with those from an IAD in the CO. In addition, the present invention provides the necessary electrical power to the customer's telephone from the CO.

Figure 3:
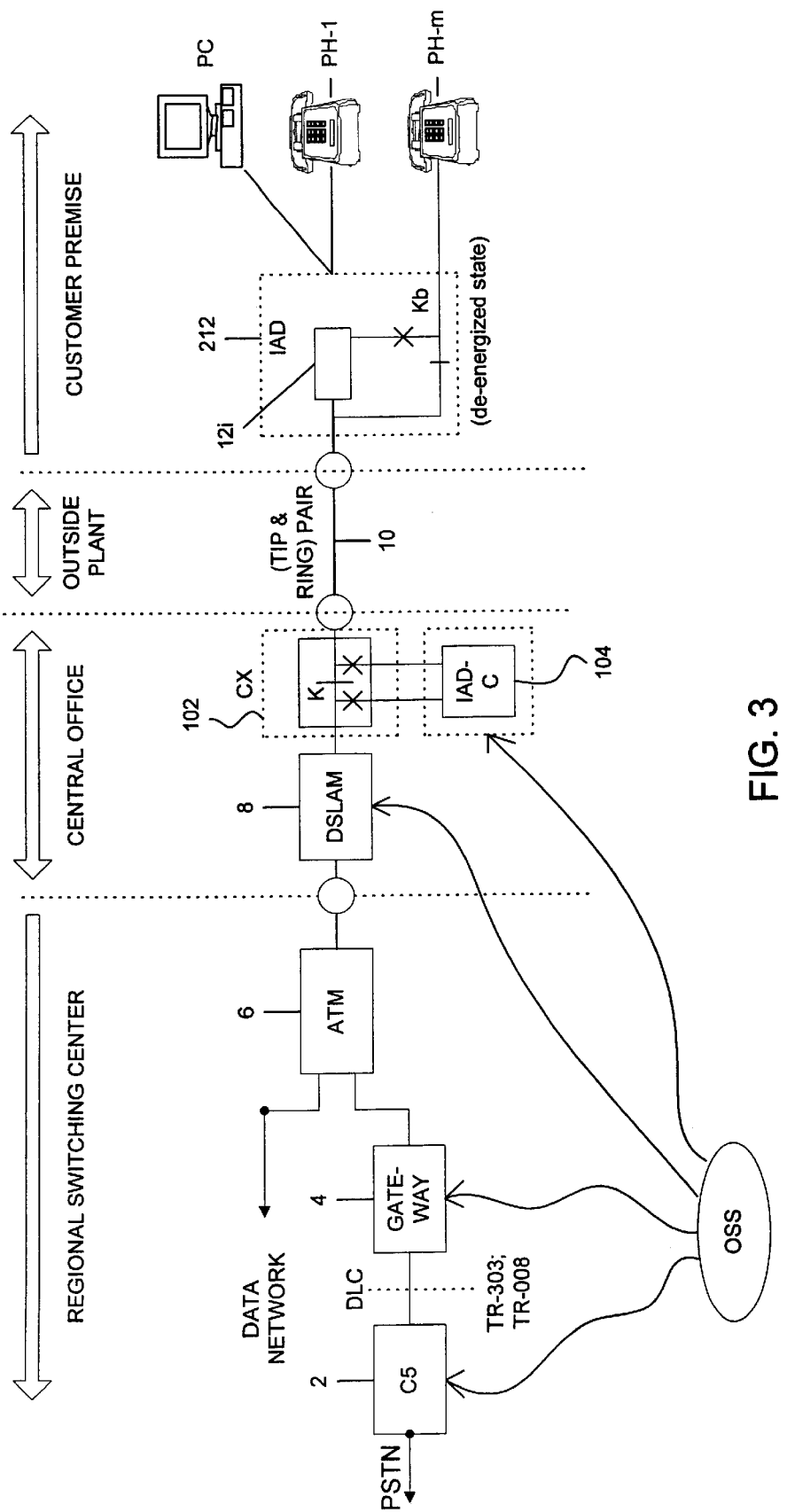
FIG. 3 illustrates a simplified block diagram of a VoDSL architecture with lifeline support in accordance with the first preferred embodiment of the present invention.

FIG. 3 illustrates a simplified block diagram of an VoDSL architecture with lifeline support in accordance with the first preferred embodiment of the present invention. The system according to the first preferred embodiment includes the network elements and components similar to those described in the conventional system, but includes additional elements such as a metallic cross connect unit (CX) 102, a relay K therein, and an integrated access device (IAD-C) 104 connected to the CX 102 at the CO. The present invention also includes a metallic bypass relay $K_b$ within the IAD 212 at the customer premise, which relay $K_b$ is illustrated is in its de-energized state in FIG. 3.

In greater detail, the CX 102 such as model "CX100 Copper CrossConnect System" from Turnstone Systems, Inc. is positioned in between the DSLAM 8 and the IAD 212. The CX100 Copper CrossConnect System is a platform that automates the physical layer infrastructure in the CO, enabling ILECs and CLECs to remotely control, test, and manage the copper pair 10. Additional information regarding Turnstone System's CX100 Copper CrossConnect System can be found at the web site trunstone.com, which contents are herein incorporated by reference. It is also noted that other units providing similar functionalities as the CX100 Copper CrossConnect System can be implemented in the present invention.

Since these additional components/devices are included in the present invention, the OSS is required to communicate with the element management software associated with the CX 102 in its overall operation, administration, and management process of the overall system. Therefore, the OSS will incorporate the new CX 102 software as an integral part of the coordination activities to operate the VoDSL system of the present invention.

Figure 2:
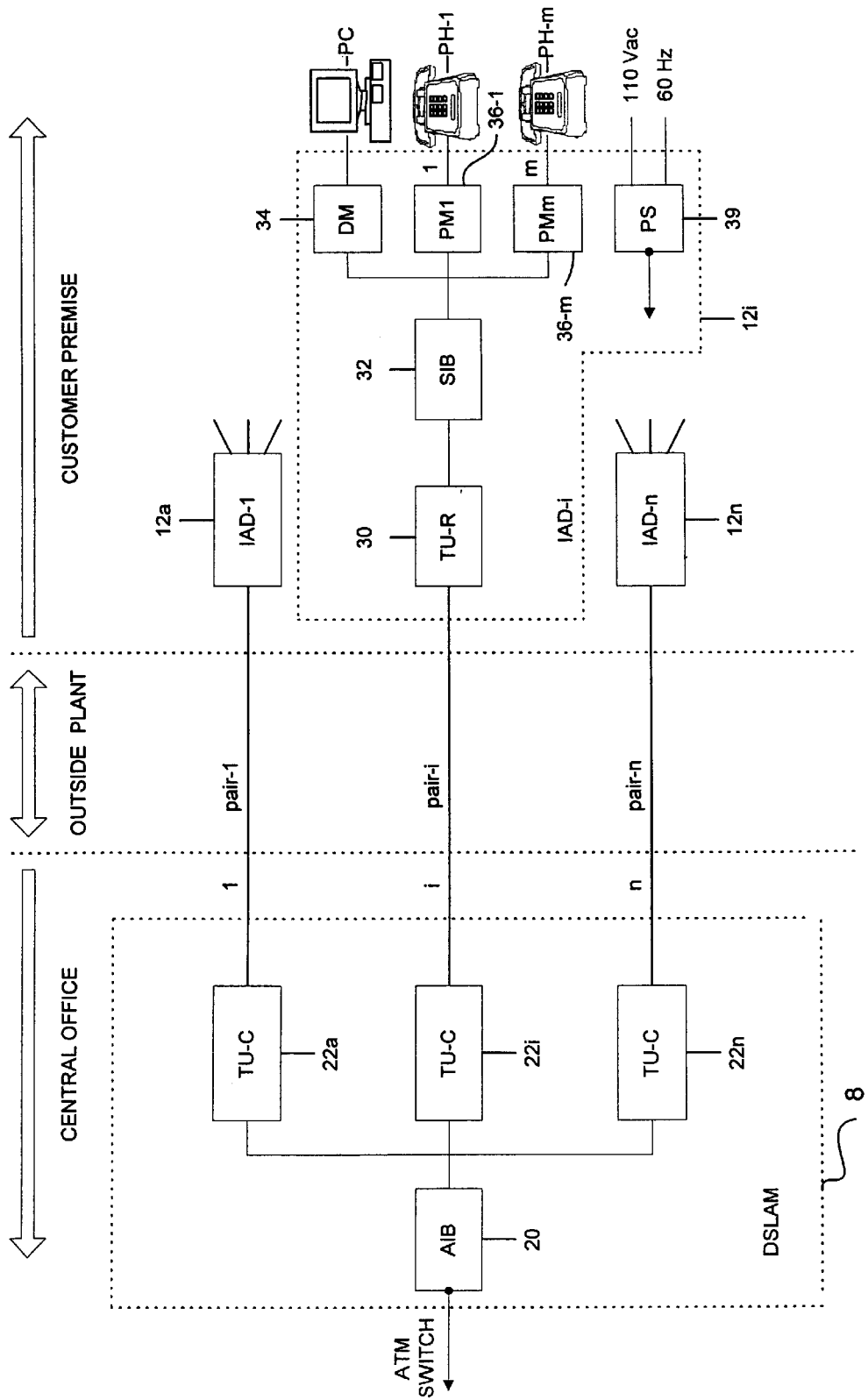
FIG. 2 illustrates a more detailed diagram of a DSLAM and IAD in the conventional VoDSL architecture of FIG. 1.

Under normal system operation condition (i.e., VoDSL service), the DSLAM 8 is connected to the IAD 212, transparently through the CX 102. In other words, the CX 102 has very little effect to the VoDSL service from the customer's standpoint. The relay $K_b$ is set in the energized state (opposite to that shown in FIG. 3) using power from the customer premise, thereby connecting the telephone PH-m to the components that are represented by block 12i (i.e., components in the IAD 12i in FIG. 2). The normal operation condition is similar to that described in the Background section herein.

As mentioned earlier, the present invention provides methods and systems for providing a telephone service to the customer during a power outage or IAD 212 failure at the customer premise. When an outage occurs or particular components of the IAD 212 fails, relay $K_b$ is de-energized (as shown in FIG. 3), thereby connecting the telephone PH-m or any other "lifeline terminal" directly to the tip and ring wires of the loop pair and bypassing block 12i in the IAD 212. These "particular components" of the IAD 212 that cause the relay $K_b$ to be de-energized upon failure are well known in the art.

At the same time, the OSS (i.e., system software) receives information or status about such outage or IAD 212 failure associated with the particular loop pair. The OSS, working in coordination with the other EMSs, commands the CX 102 EMS to actuate the relay K residing therein. When relay K is actuated, the IAD-C 104 is connected to the DSLAM 8 on one end and to the telephone PH-m on other end. This, in turn, establishes a direct path from the DSLAM 8 through the IAD-C 104 to the telephone PH-m. In this manner, electrical power from the CO can be used to provide an active telephone line to the VoDSL customer, which additional details are described later herein. This results in at least one phone line/channel (e.g., line m) or lifeline within the customer premise being active, while the remaining phone lines (m–1 lines) or channels and the data port line remain inactive until the outage or IAD 212 failure is fixed. Additional details regarding specifics conditions for providing the lifeline support is described later herein.

Figure 4:
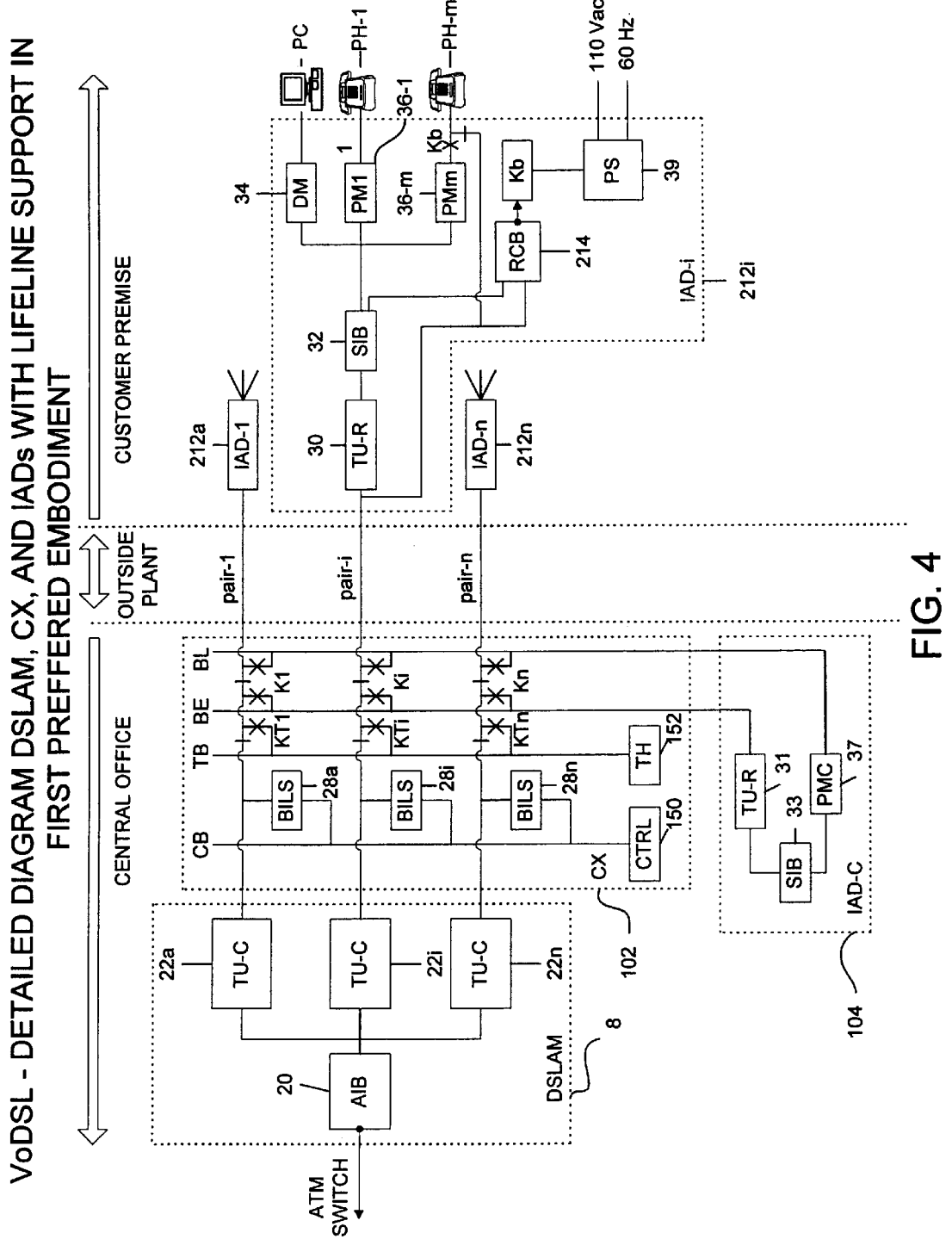
FIG. 4 illustrates a more detailed block diagram of the DSLAM, cross connect, and IADs in accordance with the first preferred embodiment of the present invention.

FIG. 4 illustrates a more detailed block diagram of the DSLAM 8, CX 102, and IADs in accordance with the first preferred embodiment of the present invention. As described earlier herein, the DSLAM 8 includes the AIB 20 and multiple TU-C blocks 22a, 22i, 22n connected thereto, and need not be discussed in further detail.

The essential components of the CX 102 consists of a control bus (CB) connected to a CX control (CTRL) 150, a test bus (TB) connected to a test head (TH) 152, bypass bus on the equipment side (BE), bypass bus on the loop side (BL), test access relays (KT1, KTi, KTn), relays K1, Ki, Kn for connecting the IAD-C 104 to the DSLAM 8 and copper pairs, and battery injection and loop supervision (BILS) blocks 28a, 28i, 28n. A more detailed description of the BILS can be found in the co-pending U.S. application Ser. No. 09/493,342 filed Jan. 28, 2000, titled "Battery Injection and Loop Supervision for DSL Environment", commonly owned by the assignee of the present invention, the contents of which are expressly incorporated herein by reference. The test head 152 includes a conventional processor board such as a P150 processor (e.g., CX100 Copper CrossConnect System), and the test access relays KT1, KTi, KTn or equivalent functional elements can be used to connect the test head 152 to the copper pair-1, pair-i, pair-n.

The IAD-C 104, which is connected to the CX 102 through the relays K1, Ki, Kn, consists of an DSL (xDSL) termination unit-remote (TU-R) 31, a service interface block (SIB) 33, and a phone module-CO (PMC) 37 (terminal module). These components/devices are similar to the corresponding components/devices in the IAD 212i (described below) and those in the IAD 12i of FIG. 2, with the exception of the PMC 37. Further, the BE and the BL connect multiple loop pairs to the TU-R 31 and PMC 37, respectively. In this manner, the IAD-C 104 can be inserted into any one of the loop pairs connected to the BE/BL buses at any given time. Stated alternatively, one IAD-C 104 can provide a lifeline service to n-number of loop pairs at one loop pair at a time.

Figure 9:
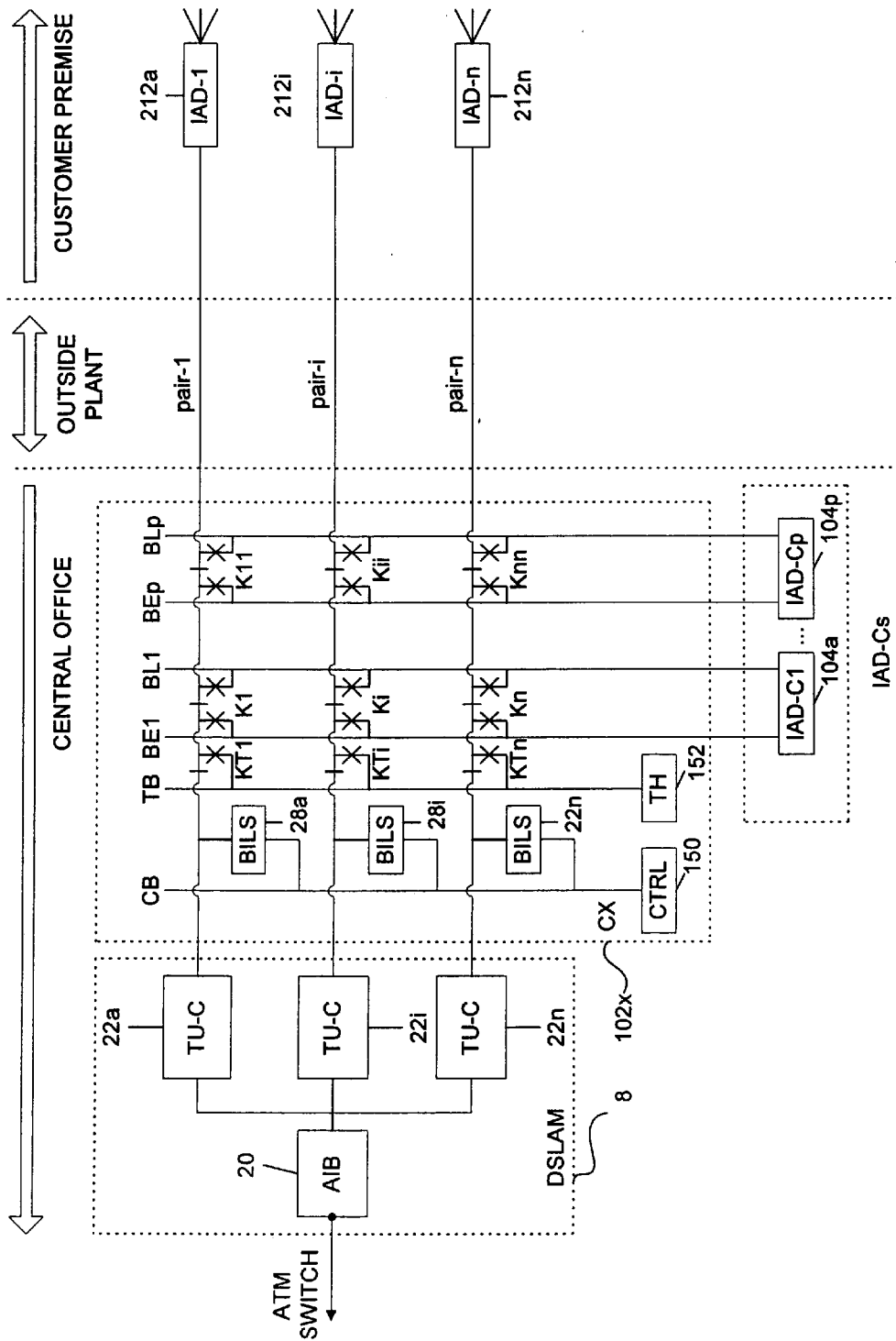
FIG. 9 illustrates a matrix architecture to enable traffic optimization in accordance with the first preferred embodiment of the present invention.

In other situations, it may be necessary to support more than one loop pair at a time for lifeline service to provide higher availability of such services. This can be accomplished by providing multiple IAD-Cs as illustrated in FIG. 9, which is described in greater detail later herein.

Again using the IAD 212i as an example, it consists of the same components/devices as those described in the IAD 12i such as the TU-R 30, SIB 32, DM 34, PM1 36-1, PMm 36-m, and PS 39. The IAD 212i, however, includes additional components/devices such as a relay control block (RCB) 214 and the bypass relay $K_b$, as described above.

As discussed above, during normal VoDSL operating condition, the TU-C 22i is connected directly to the TU-R 30, and the relay $K_B$ is energized so that the telephones PH-1, PH-m are connected to the phone modules PM1 36-1, PMm 36-m as in the conventional system. However, when a power outage or particular components of IAD failure occurs at the customer premise, the relay $K_B$ is de-energized causing the connection from telephone PH-m to phone module PMm 36-m to be terminated. Meanwhile, the same telephone PH-m is connected directly to the tip and ring wires by bypassing the phone module PMm 36-m, SIB 32, and TU-R 30. Simultaneously, the TU-C 22i recognizes the bypassing of these components through communication protocols between the TU-C 22i and the TU-R 30 and reports this event to the OSS. With this information, the OSS recognizes the affected loop pair and places it in the lifeline support mode. The OSS will also send commands to the appropriate network elements to block service to the data module and the other telephone channels within the affected IAD, with the exception of the one lifeline telephone channel.

Figure 5:
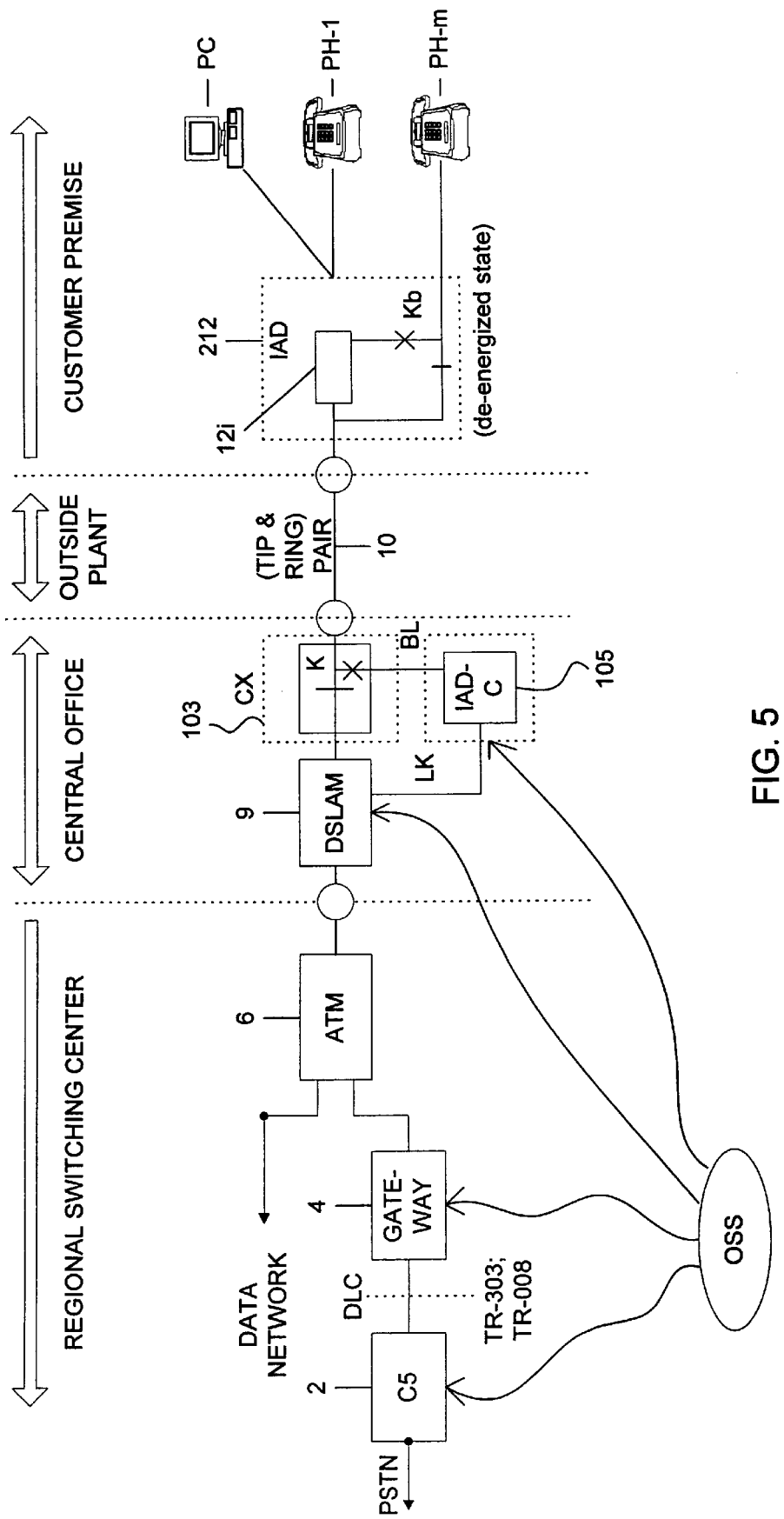
FIG. 5 illustrates a simplified block diagram of a VoDSL architecture with lifeline support in accordance with the second preferred embodiment of the present invention.

FIG. 5 illustrates a simplified block diagram of an VoDSL architecture with lifeline support in accordance with the second preferred embodiment of the present invention. The system according to the second preferred embodiment includes the network elements and components similar to those described in the system of the first preferred embodiment, but includes a metallic cross connect unit (CX) 103 (similar to CX 102) connected to an integrated access device (IAD-C) 105 through a single bus BL, and a DSLAM 9 connected to the IAD-C 105 through a lifeline link (LK) connection.

Under normal system operation condition (i.e., VoDSL service), the DSLAM 9 is connected to the IAD 212, transparently through the CX 103. In other words, the CX 103 has very little effect to the VoDSL service from the customer's standpoint. The relay $K_b$ is set in the energized state (opposite to that shown in FIG. 5) using power from the customer premise, thereby connecting the telephone PH-m to the components that are represented by block 12i (i.e., components in the IAD 12i in FIG. 2). The LK connection does not carry any traffic load signals under the normal operating condition.

When an outage occurs or particular components of the IAD 212 fails, relay $K_b$ is de-energized (as shown in FIG. 3), thereby connecting the telephone PH-m or any other "lifeline terminal" directly to the tip and ring wires of the loop pair and bypassing block 12i in the IAD 212.

At the same time, the OSS (i.e., system software) receives information or status about such outage or IAD 212 failure associated with the particular loop pair. The OSS, working in coordination with the other EMSs, commands the CX 103 EMS to actuate the relay K residing therein. When relay K is actuated, the IAD-C 105 is connected to the DSLAM 9 via the LK connection on one end and to the telephone PH-m on other end. This, in turn, establishes a direct path from the DSLAM 9 via LK connection, through the IAD-C 105 and the loop pair to the telephone PH-m, with the power to operate the telephone PH-m originating from the IAC-C 105. This results in at least one phone line/channel (e.g., line m) or lifeline within the customer premise being active, while the remaining phone lines (m−1 lines) or channels and the data port line remain inactive until the outage or IAD 212 failure is fixed.

Figure 6:
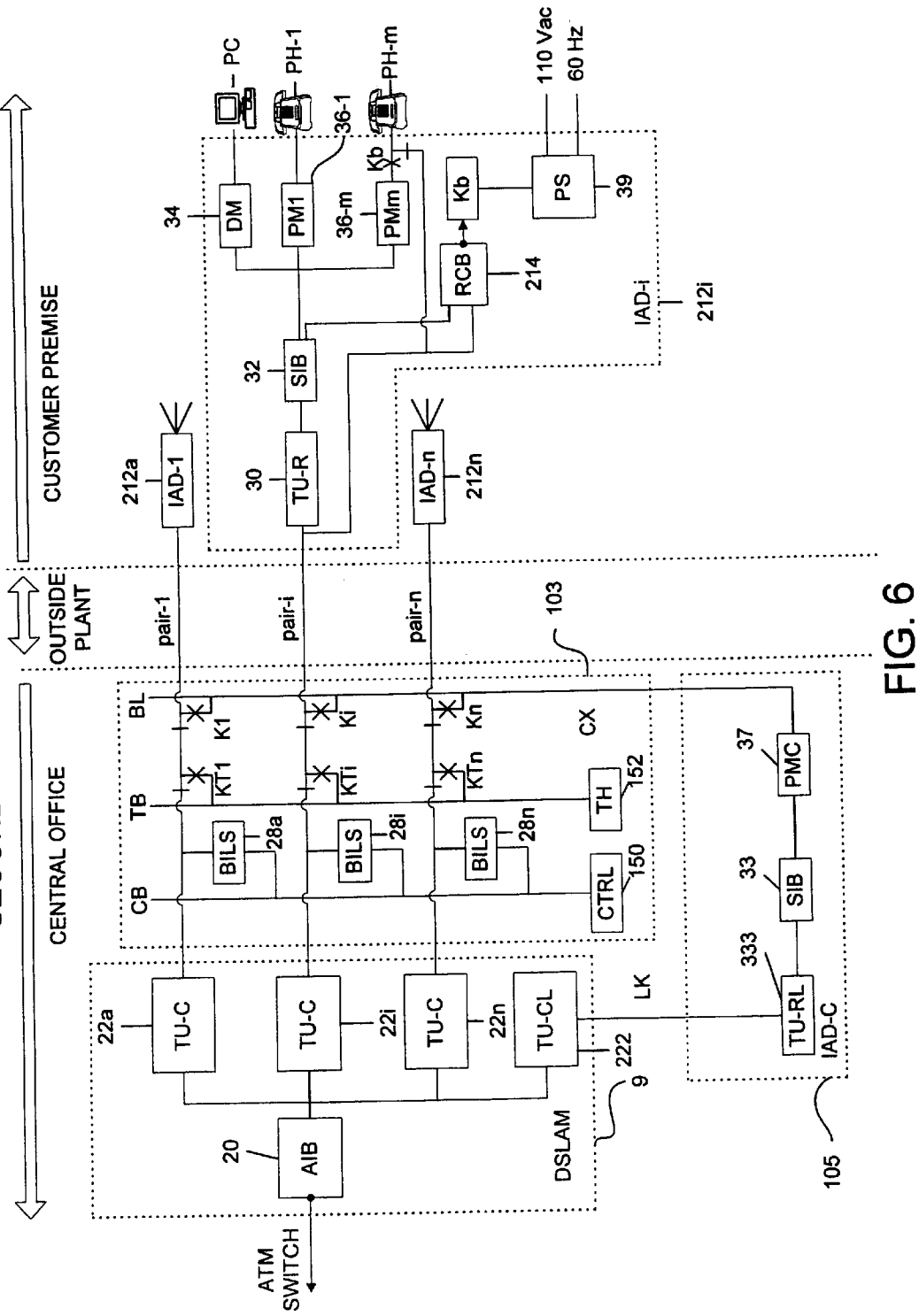
FIG. 6 illustrates a more detailed block diagram of the DSLAM, cross connect, and IADs in accordance with the second preferred embodiment of the present invention.

FIG. 6 illustrates a more detailed block diagram of the DSLAM 9, CX 103, and IADs in accordance with the second preferred embodiment of the present invention. As described earlier herein, the DSLAM 9 includes the AIB 20 and multiple TU-C blocks 22a, 22i, 22n connected thereto. The DSLAM 9 further includes an TU-CL (DSL Termination Unit-Central Office Lifeline) 222 connected to the AIB 20.

Similar to the CX 102, the essential components of the CX 103 consists of the control bus CB connected to the CX control (CTRL) 150, the test bus (TB) connected to the test head (TH) 152, bypass bus on the loop side (BL), test access relays (KT1, KTi, KTn), relays K1, Ki, Kn for connecting the IAD-C 105 to the DSLAM 9 and copper pairs, and battery injection and loop supervision (BILS) blocks 28a, 28i, 28n.

The IAD-C 105, which is connected to the CX 103 through the relays K1, Ki, Kn, consists of an DSL (XDSL) termination unit-remote lifeline (TU-RL) 333, the service interface block (SIB) 33, and the phone module-CO (PMC) 37 (terminal module). The BL connects multiple loop pairs to the PMC 37 via relay K1, Ki, Kn. In this manner, the IAD-C 105 can be inserted into any one of the loop pairs connected to the BL bus at any given time. Stated alternatively, one IAD-C 105 can provide a lifeline service to n-number of loop pairs at one loop pair at a time.

The TU-CL 222 is preferably an optimized version of the TU-C 22a, 22i, 22n, for interfacing with a much shorter loop length. Similarly, the TU-RL 333 is also an optimized version of the TU-R 30. As described above, the PMC 37 has the same functionality of the PM 36-1, 36-m, as in the IAD-i 212i, except that the PMC 37 has to interface to a longer loop length and has a more stringent outside plant operating environment.

Figure 10:
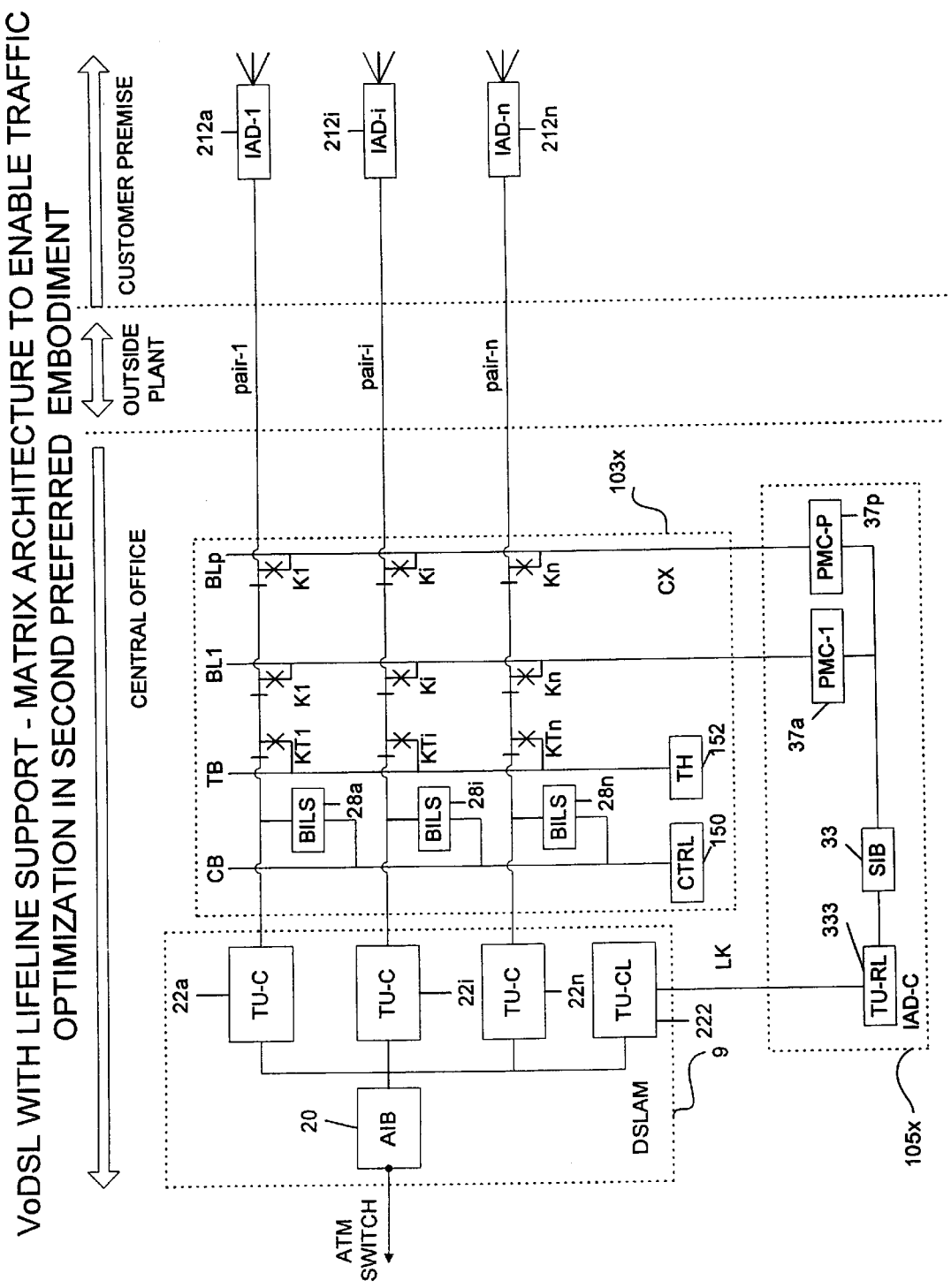
FIG. 10 illustrates a matrix architecture to enable traffic optimization in accordance with the second preferred embodiment of the present invention.

In other situations, it may be necessary to support more than one loop pair at a time for lifeline service to provide higher availability of such services. This can be accomplished by providing multiple PMCs in the IAD-C as illustrated in FIG. 10, which is described in greater detail later herein.

Figure 7:
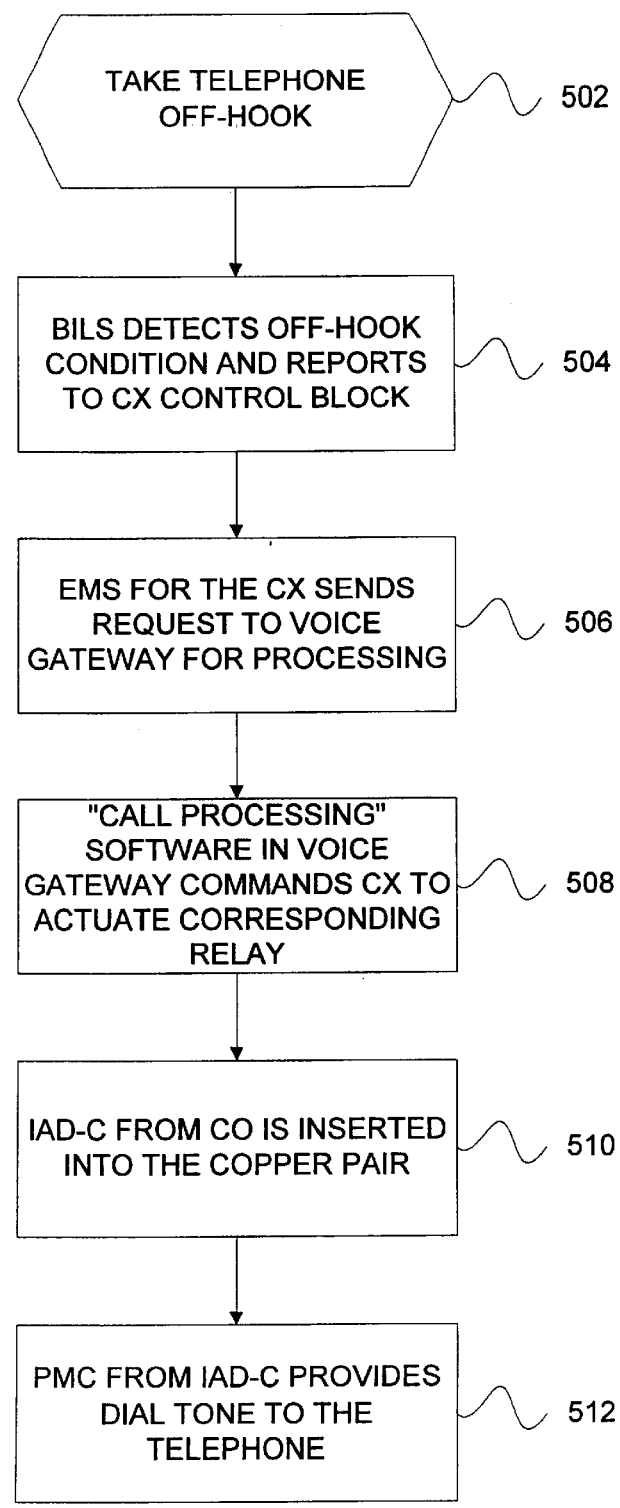
FIG. 7 illustrates a flow diagram showing the call origination operation from the customer premise in accordance with the first and second preferred embodiments of the present invention.

FIG. 7 illustrates a flow diagram showing the call origination operation from the customer premise in accordance with the first and second preferred embodiments of the present invention. Reference will be made to FIGS. 3–6 concurrently for a more complete understanding of this operation. Assuming loop pair i is in the lifeline support mode, to make a telephone call, the telephone PH-m is taken off-hook in step 502. The BILS 28$i$ detects the off-hook status and reports it to the CTRL block 150 via the control bus CB in step 504. In step 506, the EMS for the CX 102 or CX 103 then transmits this status to the gateway 4 for processing the request for lifeline service. A "call processing" software in the gateway 4 then commands the CX 102 or CX 103 to actuate the relay Ki therein in step 508. Thereafter, after actuating the relay Ki, the IAD-C 104 or IAD-C 105, is inserted into the copper pair-i in step 510. In the first preferred embodiment, the TU-C 22$i$ is then connected to the TU-R 31 through bus BE, and the telephone PH-m is connected to the PMC 37 through bus BL and the copper pair-i. In the second preferred embodiment, the TU-C 22$i$ is disconnected and the voice path to the phone PH-m is through the TU-CL 222, TU-RL 333, SIB 33, PMC 37, bus BL and the loop pair.

The PMC 37 possess all the functionality required to support the traditional POTS service. The POTS functionality is known to as the "BORSCH" function, which stands for "Battery Overvoltage Ringing Supervision Codec Hybrid". At this stage, the PMC 37 provides power and a dial tone to the customer in step 512, which allows the customer to originate a call from the customer premise in the traditional manner. The PMC 37 has the same functionality as the PMm 36-m in the IAD-i 212$i$ except that the parametric requirement has to comply with longer loop length. The PMC 37 is commonly known and widely available in the industry.

It should be noted that the supervision of the affected loop pair is a two step process where in the first step, the loop pair is supervised by the BILS 28$i$ during the idle state. Once an off-hook condition is detected, the loop pair is supervised by the PMC 37 in the second stage. This process is essential to support simultaneous and multiple copper loop pairs.

Figure 8:
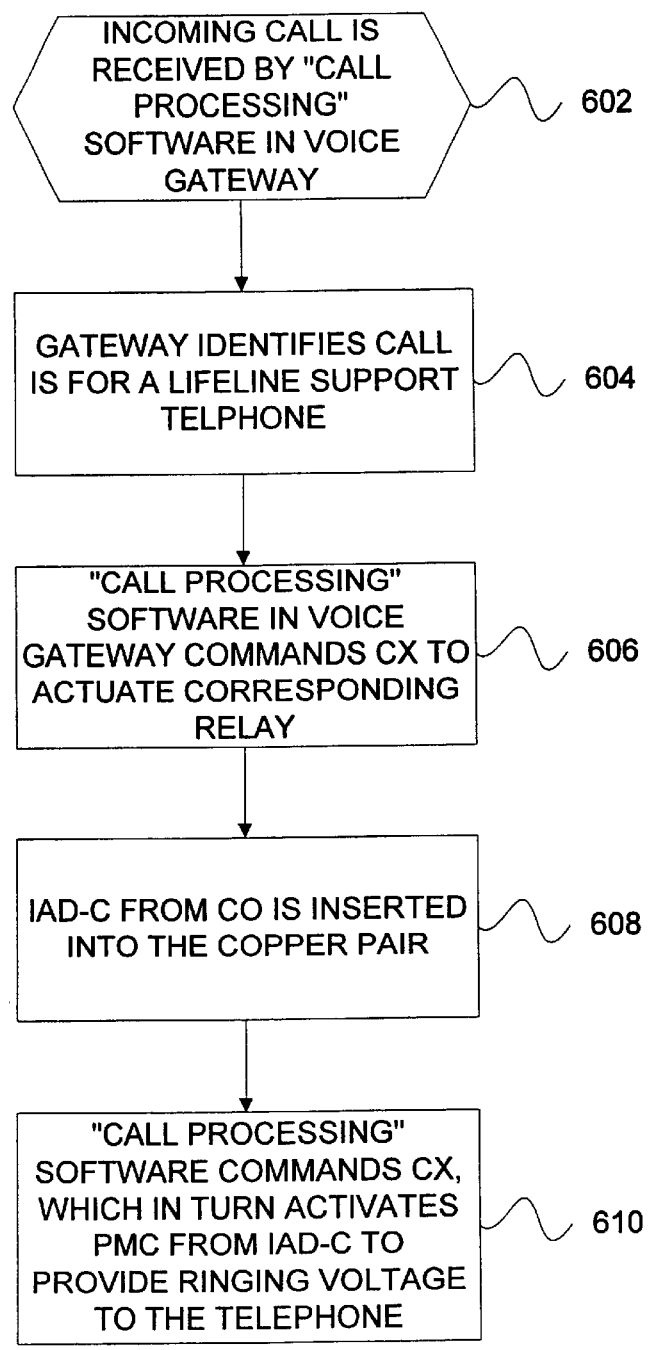
FIG. 8 illustrates a flow diagram showing the call termination operation to the customer premise in accordance with the first and second preferred embodiments of the present invention.

FIG. 8 illustrates a flow diagram showing the call termination operation to the customer premise in accordance with the first and second preferred embodiments of the present invention. Again, reference will be made to FIGS. 3–6 concurrently for a more complete understanding of this operation.

When a telephone call is made to the lifeline telephone PH-m, the incoming call is received by the "call processing" software in the gateway 4 in step 602. The gateway 4 identifies that the particular call is for a lifeline telephone PH-m in step 604, and commands the CX 102 or CX 103 to actuate the relay Ki corresponding to the loop pair-i in step 606. When the relay Ki is actuated, this results in inserting the IAD-C 104 or IAD-C 105 into the copper pair-i in step 608, as described above. In step 610, the call processing software commands the CX 102 or CX 103, which in turn activates the ringing function in the PMC 37 to send a ringing voltage to the telephone PH-m.

The customer answers by picking up the phone receiver, creating an off-hook condition. This off-hook condition is detected by the supervision circuit in the PMC 37, which immediate causes the removal of the ringing voltage. Thereafter, a voice path is established between the two parties as in the conventional system.

It is evident from the call origination and termination descriptions provided above that each time a lifeline call is active, one set of BE/BL buses or one BL bus is occupied and it can not support another "call" on the same bus at that time. To overcome this limitation, matrix architectures as illustrated in FIGS. 9 and 10 can be implemented.

FIG. 9 illustrates a matrix architecture to enable traffic optimization in accordance with the first preferred embodiment of the present invention. The copper cross connect matrix in the CX 102$x$ now has p-number of BE/BL buses with each terminating with a corresponding IAD-C1 104$a$, IAD-Cp 104$p$ for a total of p-number IAD-Cs. Consequently, the CX 102$x$ architecture can support multiple lifeline services simultaneously.

In greater detail, assuming one set of BE/BL bus is occupied, the next call to/from the lifeline telephone can be supported by a different set of BE/BL bus in the CX 102$x$. This process can continue until all the available sets of BE/BL buses are occupied. By properly choosing the numbers p and n, where n is the number of loop pairs and IADs, the present invention can be customized to support a desired level of lifeline services to various customers. In addition, this customization and flexibility provides trade offs between the cost and lifeline service availability for each system.

FIG. 10 illustrates a matrix architecture to enable traffic optimization in accordance with the second preferred embodiment of the present invention. The copper cross connect matrix in the CX 103$x$ now has p-number of BL buses with each terminating with a corresponding PMC-1 37$a$, PMC-P 37$p$ in the IAD-C 105$x$ for a total of p-number PMCs. Consequently, the CX 103$x$ and IAD-C 105$x$ architectures can support multiple lifeline services simultaneously.

In greater detail, assuming BL bus is occupied, the next call to/from the lifeline telephone can be supported by a different BL bus in the CX 103$x$. This process can continue until all the available BL buses are occupied. By properly choosing the numbers p and n, where n is the number of loop pairs and IADs, the present invention can be customized to support a desired level of lifeline services to various customers. In addition, this customization and flexibility provides trade offs between the cost and lifeline service availability for each system.

Figure 11:
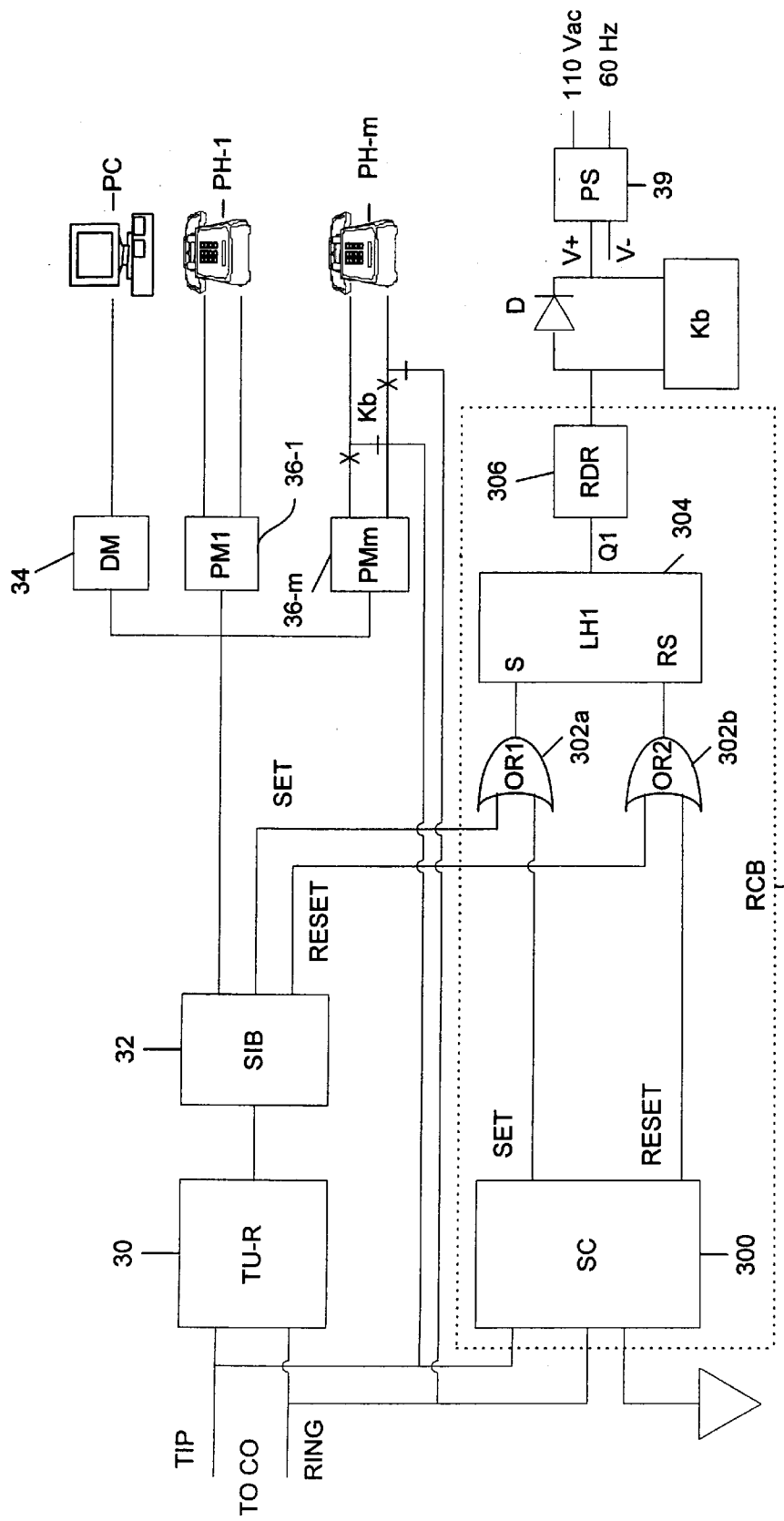
FIG. 11 illustrates a more detailed block diagram of the RCB within the IAD in accordance with the first and second preferred embodiments of the present invention.

FIG. 11 illustrates a more detailed block diagram of the RCB within the IAD in accordance with the preferred embodiments of the present invention. The RCB 214 includes a signal conditioner SC 300, first OR gate (OR1) 302$a$, second OR gate (OR2) 302$b$, latch (LH1) 304 and relay driver (RDR) 306.

The relay $K_B$ and an associated suppression diode D are also illustrated in FIG. 11. Relay $K_B$ is preferably a standard (i.e. non-latching) type relay to insure that when the power supply fails in the IAD-i, the relay $K_B$ automatically reverts to the "de-energized" or "reset' mode. The diode D is used to suppress the voltage transient produced during operation.

In further detail, the SC 300 conditions the signal from the tip and ring wires to be within the voltage range acceptable to the circuitry in the RCB 214. The detected signal is compared to reference voltages to generate either a "set" or "reset" signals at the SC 300 outputs, which is dependent on the input signal level and polarity.

When a "set" output is generated in the SC 300, it is sent to the first OR gate OR1 302a before it is inputted into the "s" (set) input of the latch LH1 304. Conversely, when a "reset" output is generated in the SC 300, it is sent to the second OR gate OR2 302b before it is inputted into the "rs" (reset) input of latch LH1 304. For example, a logical 1 at the output of first OR gate OR1 302a produces a logical 1 at the Q1 output of latch LH1 304, and logical 1 at the output of second OR gate 302b produces a logical 0 at the Q1 output.

The signal Q1 is then sent to the relay driver RDR 306. If the signal Q1 is a logical 1, the RDR 306 will energize the relay $K_B$. In addition, if the detected signal at the tip and ring wires produces a logical 1 at the SC 300 "set" output, the relay $K_B$ is again "set" or energized. On the other hand, if the detected signal produces a logical 1 at the SC 300 "reset" output, the relay $K_B$ is "reset" or de-energized. This process is used to provide the lifeline support when the IAD 212 has failed for any reason as in the case (3) described below.

It should also be noted that there are two other signals, designated as "set" and "reset", sent from the SIB block 32 to the first OR gate OR1 302a and second OR gate OR2 302b, respectively. Again, logical 1's in these signals will enable the same operation behavior for relay $K_B$ as described above. This process is used to control the lifeline support function when there is a need to bypass the functional IAD 212 for testing or maintenance as in the case (4) described below.

Figure 12:
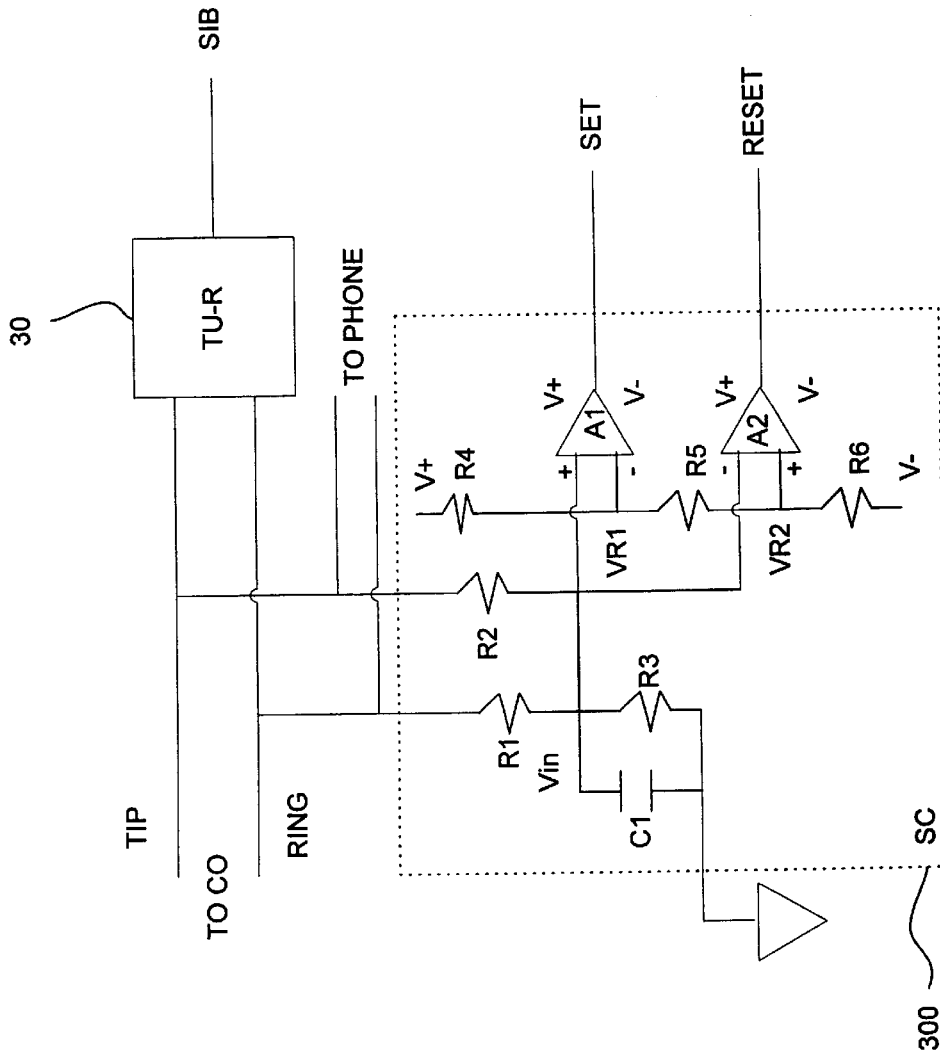
FIG. 12 illustrates an example of a detailed circuit diagram of the SC in accordance with the first and second preferred embodiments of the present invention.

FIG. 12 illustrates an example of a detailed circuit diagram of the SC 300 in accordance with the preferred embodiments of the present invention. The SC 300 is represented by resistors R1–R6, capacitor C1, and amplifiers A1, A2. Resistors R1, R2 and R3 form a voltage divider to scale the signal to be within the voltage operation range of the circuit. The voltage range is defined by supply voltages V– and V+. Capacitor C1 is used to filter out spurious signals, which could cause erroneous operation. One end of the resistors R4, R5, and R6 string connects to the V+ and the other end connects to V– to form a voltage divider in order to generate reference voltages VR1 and VR2. In one embodiment, the reference voltage VR1 can be positive with respect to ground and the reference voltage VR2 can be negative with respect to ground. Amplifiers A1 and A2 compare the voltage $V_{in}$, which is proportional to voltage at the tip and ring wires, with reference voltages VR1 and VR2. When the voltage $V_{in}$ is more positive than reference voltage VR1, this will result in a logical 1 at the "set" output. On the other hand, when the voltage $V_{in}$ is more negative than reference voltage VR2, this will result in a logical 1 at the "reset" output.

In summary, there are generally four different conditions that require actuating the relay $K_b$ for lifeline support: (1) electrical power outage at the customer premise; (2) failure of the power supply powering the IAD 212; (3) failure of particular components of the IAD 212 without power supply failure; and (4) voluntary bypassing of the IAD 212 in cases where the TU-C has failed or for testing and maintenance.

For the first two cases (1) and (2), the electrical power outage de-energizes relay $K_B$ and automatically connects the lifeline telephone PH-m to the tip and ring wires, bypassing the IAD-i components. The OSS (system software) receives status of the power outage through its protocols via the TU-C in the DSLAM For the third case (3), the system software receives status of IAD-i failure from the EMS of the DSLAM through protocols for the TU-C. The OSS will need to provide the necessary commands to connect the lifeline telephone PH-m to the tip and ring wires. This is accomplished when the system software commands the CX to actuate the relay KTi therein, thereby connecting the loop pair-i to the test bus TB. This allows the IAD-i to connect to the test head TH in the cross connect CX. The TH is then commanded to send a longitudinal DC voltage signal to reset relay $K_B$, which de-energizes it, and connects the lifeline telephone PH-m to the tip and ring wires. An example of the signaling approach is disclosed in co-pending U.S. applications Ser. No. 09/476,226 filed Dec. 30, 1999, titled "Remotely Addressable Maintenance Unit" and Ser. No. 09/516,345 filed Mar. 1, 2000, titled "Remotely Actuated Splitter Bypass System and Method".

In one embodiment, relays are "set" or energized when an appropriate positive voltage is applied from tip and ring wires with respect to the ground wire. Conversely, relays are "reset" when an appropriate negative voltage is applied from tip and ring wires with respect to the ground wire.

In greater detail, each relay can be set with a positive polarity, using some arbitrary voltage range, which range is pre-defined/pre-designed. Conversely, each relay can be reset with a negative polarity, using some arbitrary voltage range, which range again is pre-defined/pre-designed. In additional, a particular voltage range that sets a particular relay or relays may include a reciprocal voltage range to reset another relay or relays. In this manner, multiple relays can be remotely actuated from the CO by providing different voltages and polarities. The polarity of the voltages for set and reset conditions can be interchangeable by a person skill in this art (i.e., set having negative polarities and reset having positive polarities).

For the fourth case (4), the relay $K_b$ can be "reset" (de-energize) and "set" (energize) using the service interface block SIB. This operation is described in greater detail earlier herein.

The relays described herein can be switched via software, hardware, or combinations thereof, but in certain embodiments, the relays are controlled via hardware functions. Further, although the lifeline service described herein is implemented with one bypass relay, it is understood that more than one relay in the customer premise can be used herein.and is within the scope of the present invention.

In other embodiments, other components can be substituted for the specific components described herein so long as these components perform essentially identical functions as described herein.

In the previous descriptions, numerous specific details are set forth, such as specific functions, components, etc., to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

We claim:

1. A method for providing a lifeline service to a customer using a VoDSL service, the method comprising:

actuating a first relay in a first integrated access device at a customer premise, the actuating of the first relay allowing a lifeline terminal to connect directly to tip and ring wires while bypassing certain components in the first integrated access device, wherein the first relay is actuated by a DC voltage signal from a test head in a central office;

inserting a second integrated access device from the central office in the tip and ring wires using a second relay, wherein the second integrated access device is coupled to a DSLAM and a cross connect unit;

applying a voltage to the lifeline terminal from the central office; and providing the lifeline service to the customer through the lifeline terminal.

2. The method according to claim 1, wherein the second integrated unit comprises a service interface block coupled to a central office termination unit and a central office terminal module.

3. The method according to claim 2, wherein the central office termination unit is connected to the DSLAM using a lifeline connection link and the central office terminal module is connected to the cross connect unit using a bypass bus.

4. The method according to claim 1, wherein the first relay is actuated when the first integrated access device at the customer premise has failed.

5. The method according to claim 1, wherein the first relay is actuated before testing or maintenance of the VoDSL service.

6. The method according to claim 1, wherein the lifeline terminal comprises a telephone and the central office terminal module comprises a telephone module.

7. The method according to claim 1, wherein the actuating further comprises de-energizing or energizing the first relay to bypass certain components in the first integrated access device.

8. The method according to claim 7, wherein the certain components comprise a customer termination unit, a customer service interface block, and a customer terminal module.

9. The method according to claim 1, wherein resetting or setting the first relay provides a bypass mode.

10. The method according to claim 1, wherein the first relay comprises a non-latching relay.

11. The method according to claim 1, wherein the test head is coupled to the first relay using a test bus.

12. A method of simultaneously providing lifeline services to a plurality of lifeline terminals using VoDSL service, comprising:

actuating a plurality of relays in a plurality of first integrated access devices at the plurality of customer premises, the actuating of the relays allowing a plurality of lifeline terminals to bypass certain components in the plurality of the first integrated access devices and connect directly to a plurality of tip and ring wires, wherein one or more of the plurality of relays is actuated by a DC voltage signal from a test head in a central office;

inserting a second integrated access device having a plurality of central office terminal modules from the central office in the tip and ring wires using a plurality of second-relays, wherein the second integrated access device is coupled to a DSLAM and a cross connect unit;

applying voltages to the lifeline terminals; and providing the lifeline services to the plurality of customers through the plurality of lifeline terminals and the plurality of central office terminal modules.

13. The method according to claim 12, wherein the certain components comprise customer termination units, customer service interface blocks and customer terminal modules.

14. The method according to claim 12, wherein the plurality of central office terminal modules are coupled to a central office service interface block and central office termination unit.

* * * * *